United States Patent
Spickard

(10) Patent No.: US 7,351,179 B2
(45) Date of Patent: Apr. 1, 2008

(54) STEPPER MOTOR DRIVEN PROPORTIONAL ACTUATOR

(75) Inventor: Mark A. Spickard, Rockford, IL (US)

(73) Assignee: Woodward Governor Company, Rockford, IL (US)

( * ) Notice: Subject to any disclaimer, the term of this patent is extended or adjusted under 35 U.S.C. 154(b) by 158 days.

(21) Appl. No.: 11/234,019

(22) Filed: Sep. 23, 2005

(65) Prior Publication Data

US 2007/0069592 A1 Mar. 29, 2007

(51) Int. Cl.
*F16H 3/74* (2006.01)
*F16K 29/00* (2006.01)
*F16K 31/06* (2006.01)

(52) U.S. Cl. .................. 475/255; 137/330; 137/625.65

(58) Field of Classification Search ................ 475/255, 475/331; 137/625.64, 625.66; 239/225.1, 239/541, 583
See application file for complete search history.

(56) References Cited

U.S. PATENT DOCUMENTS

| | | | |
|---|---|---|---|
| 3,405,727 A | | 10/1968 | Hill |
| 3,406,701 A | | 10/1968 | Meulendyk |
| 4,090,589 A | * | 5/1978 | Fitzwater .................. 185/40 R |
| 4,664,084 A | * | 5/1987 | Wheelock ................... 123/462 |
| 4,672,992 A | | 6/1987 | Vanderlaan et al. |
| 4,793,377 A | * | 12/1988 | Haynes et al. ......... 137/625.65 |
| 6,214,300 B1 | * | 4/2001 | Morrison et al. ........... 422/238 |
| 2003/0226995 A1 | * | 12/2003 | Burgos ....................... 251/248 |
| 2006/0218928 A1 | * | 10/2006 | Spickard et al. .............. 60/773 |

* cited by examiner

*Primary Examiner*—Tisha Lewis
(74) *Attorney, Agent, or Firm*—Reinhart Boerner Van Deuren P.C.

(57) ABSTRACT

A low energy stepper motor driven actuator that eliminates the need for a position sensor is provided. The stepper motor rotates a cam in a control piston valve. The cam rotation increases the gap between the cam and nozzle on one side of the cam and decreases the gap between the cam and nozzle on the other side. The gap differences affect the pressures on the control piston ends, which forces the piston in the direction that will re-equalize the cam-nozzle gaps. As a result, piston moves to a position such that the head or rod of the actuator piston receives high pressure flow, thereby moving the actuator. Movement of the actuator rod provides mechanical feedback to the cam, causing the cam to move back to its mechanical null position.

20 Claims, 5 Drawing Sheets

US 7,351,179 B2

STEPPER MOTOR DRIVEN PROPORTIONAL ACTUATOR

FIELD OF THE INVENTION

This invention pertains to actuators, and more particularly to sensorless actuators.

BACKGROUND OF THE INVENTION

Conventional actuator systems employ a closed loop position control system. These systems include a position sensor for actuator position feedback and either an integrating controller or proportional controller used for control. The integrating controller assures that the steady state sensed position matches the commanded position. However, the actual position versus commanded position is still susceptible to inaccuracies of the position sensor gain and position (i.e., calibration of the position sensor to the valve position), the position sensor demodulator accuracy, channel-channel tracking and digital resolution. The proportional controller is susceptible to the above inaccuracies as well as an allowed steady state error that is a function of disturbance magnitudes and the proportional gain of the controller.

Regardless of the controller type, the accuracy of the system is very highly dependent on the position sensor accuracy. For precise metering applications such as in aircraft systems, the position sensors need to be very accurate and have high resolution. While very accurate, the position sensors are typically very expensive, both in terms of time and cost. They are relatively difficult to interface with due to the mechanical interface, the hydraulic interface, the number of small gauge wires, complicated demodulation circuitry, etc. Position sensors are also prone to failure due to the reliability of small gauge wires. This failure mode leads to dual channel requirements (i.e., two separate position sensors, drivers, and motor control) and additional cost in order to meet reliability requirements.

Elimination of the position feedback sensor will save money and weight. However, the lack of position feedback and the closed loop controller means that the effects of disturbances and/or the variations in forward path gain that are sensed and/or compensated in the closed loop controller will no longer be sensed and/or compensated. To negate these adverse effects, the magnitude of the disturbances should be minimized, the inherent disturbance rejection characteristics of the forward path should be maximized and the gain accuracy of the forward path should be made insensitive to the environment. In other words, the forward path must be "robust." The forward path must also be strictly proportional since there is no feedback to prevent the divergence that would occur with an integrating forward path.

Open loop, proportional electro-hydraulic servo valve (EHSV) based actuator systems use a low energy torque motor that controls hydraulics that drive the actuator. The motor used has high speed but very low torque. The low torque levels result in the motor (and thus the actuator) being substantially affected by relatively small DC torque disturbances. For example, isolation seals, relaxation of torsion spring preload, magnet MMF (magnetomotive force) variations, variations in flux path reluctance, discrete steps in nozzle pressure feedback forces, thermal induced movement of parts, etc. can affect the torque motor. The relatively undamped torque motor also does not support good dynamic torque disturbance rejection (e.g., current transient, vibration, etc.) and creates resonance issues. The actuator position is fed back to the motor via springs. This indirect position feedback technique does not provide adequate load disturbance rejection for most applications.

What is needed is a system that overcomes the problems of sensorless actuators as discussed above. The invention provides a system with such features. These and other advantages of the invention, as well as additional inventive features, will be apparent from the description of the invention provided herein.

BRIEF SUMMARY OF THE INVENTION

The invention provides a stepper motor driven proportional actuator that eliminates the need for a position feedback sensor. The stepper motor is used to drive a cam that is designed such that the cross-cam distance on the nozzle-nozzle centerline of the fuel metering valve is a constant for any operational cam angle. Additionally, the tangent to the cam surface is perpendicular to the nozzle-nozzle centerline, thereby allowing the cam to contact and push on the nozzles if needed.

The stepper motor drives a gearbox connected to the cam. The gearbox in one embodiment is a planetary gear system having an outer ring gear connected in mesh relationship to sun gears, which are connected together with a sun frame and are in mesh relationship with a pinion gear. The outer ring gear is rotatably connected to a rack that is integrated to the actuator piston. The pinion gear is integral to the stepper motor rotor. When the stepper motor turns, the resultant pinion gear rotation cause the sun gears and sun frame to rotate. An output shaft that is attached to the sun frame and cam rotates with it. The cam rotation opens (or closes) cam/nozzle gaps causing the control piston to translate, thereby opening the head and rod ports to supply or drain causing the actuator piston and rack to stroke. The rack provides direct actuator position feedback to the outer ring gear and causes the outer ring gear to rotate. The rotation of the ring gear causes the sun gears and the sun frame to rotate back to their original position, thereby rotating the cam and translating the control valve to its mechanical null position.

Other aspects, objectives and advantages of the invention will become more apparent from the following detailed description when taken in conjunction with the accompanying drawings.

While the invention will be described in connection with certain preferred embodiments, there is no intent to limit it to those embodiments. On the contrary, the intent cover all alternatives, modifications and equivalents as included within the spirit and the invention as defined by the appended claims.

DETAILED DESCRIPTION OF THE INVENTION

The invention provides a stepper motor driven actuator system that eliminates the need for a position sensor and position feedback. The hydraulic amplification that is typically provided by an EHSV flapper valve is eliminated and replaced with a constant gain cam-nozzle amplification-tracking system. The combination of the cam-nozzle, stepper motor, and a gearbox in communication with the rack of the actuator piston provides an accurate and robust actuation positioning system. One feature of the invention is that it can provide a "fail-fixed" system, that is, a system that maintains it's last commanded position in the event of electrical power failure.

Figure 1:
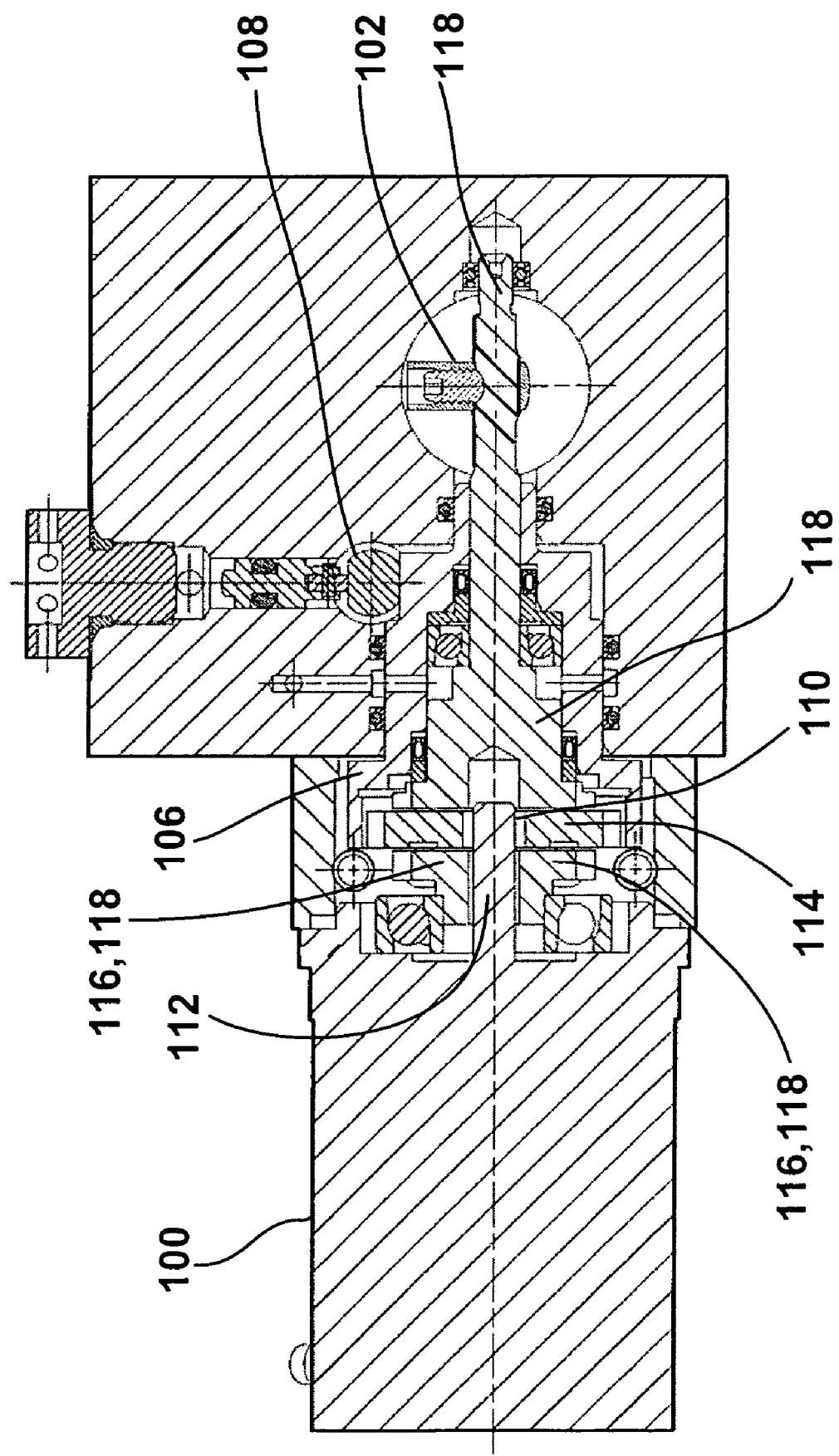
FIG. 1 is a cross-sectional view of the actuator system in accordance with the teachings of the present invention.
Figure 2:
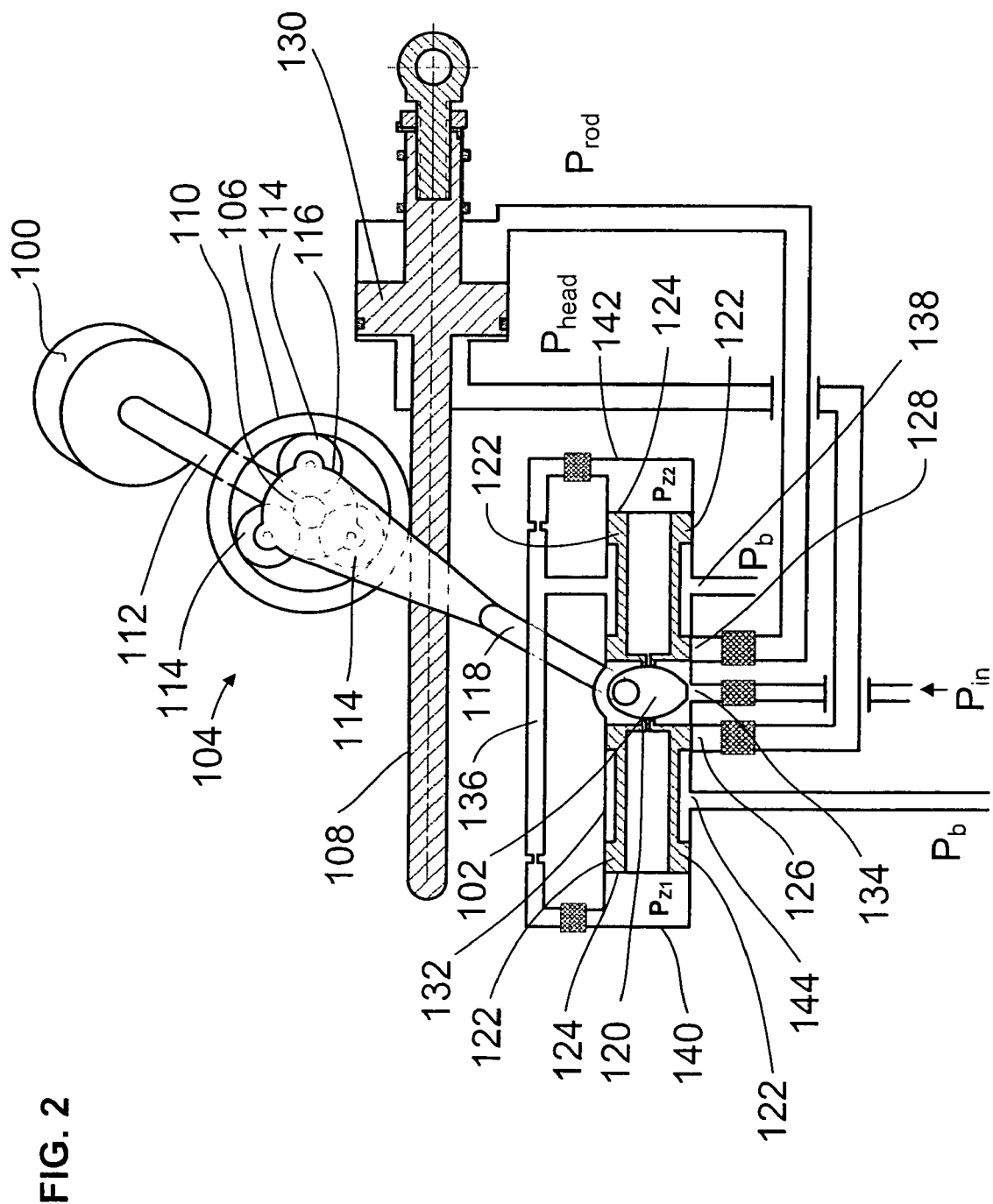
FIG. 2 is a partial cross-sectional view of the actuator system of FIG. 1 with the stepper motor shown as a separate component for clarity and the valve piston at a centered position.
Figure 3:
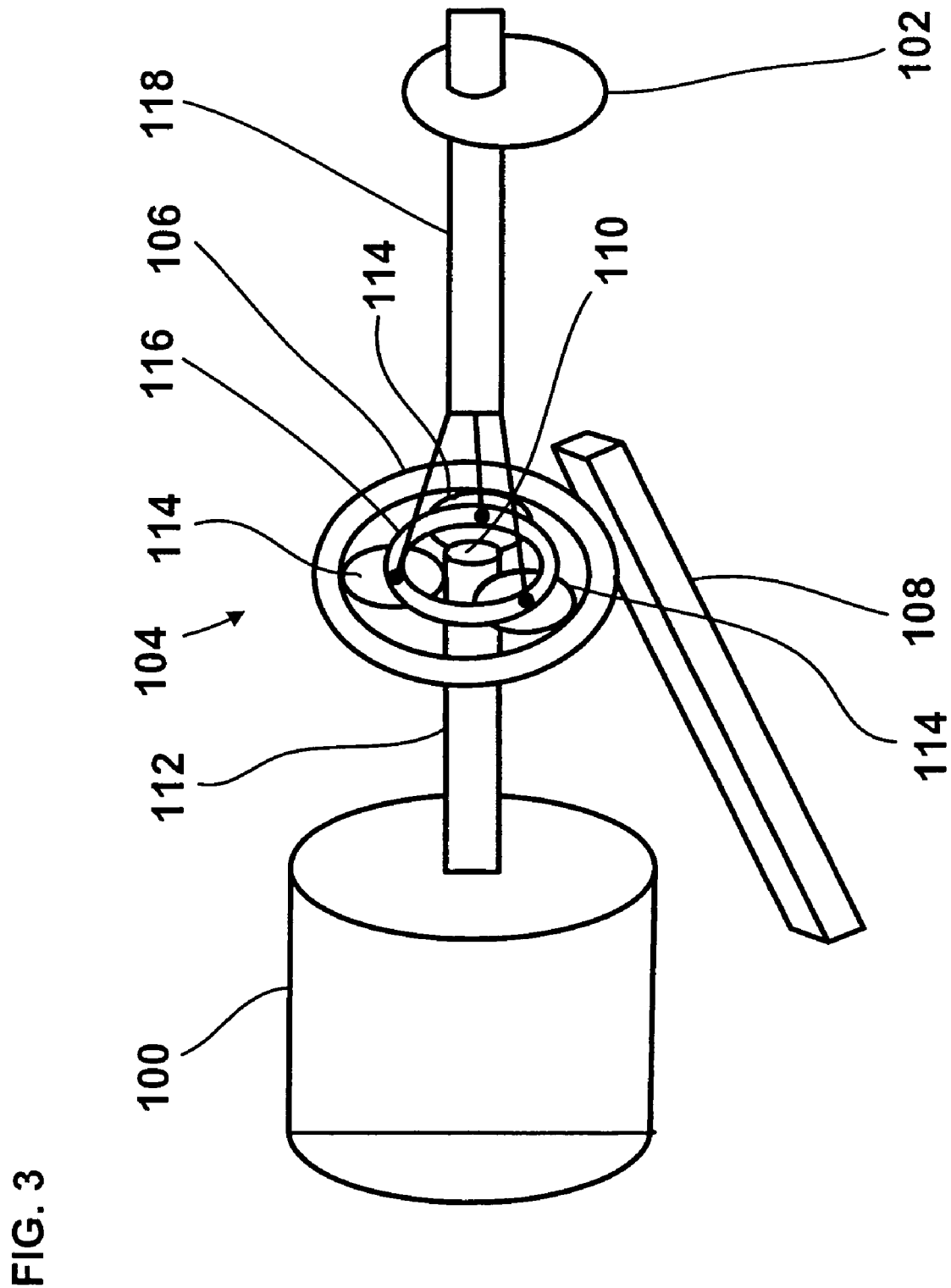
FIG. 3 is a schematic view of the actuator system of FIG. 2 illustrating the cam-rack interaction.

Turning to the drawings, wherein like reference numerals refer to like elements, the invention provides a stepper motor driven robust proportional actuator. With reference to FIGS. 1 to 3, a stepper motor 100 is used to drive cam 102. The stepper motor drives a planetary gear system 104 where the ring gear 106 is in mesh relation to rack 108. The pinion gear 110 is integral to the stepper motor rotor 112. When the stepper motor 100 is rotated, the pinion gear 110 rotates. The pinion gear 110 rotation causes the sun gears 114 and sun frame 116 to rotate. The output shaft 118 is attached to the sun frame 116 and rotates with it. Similarly, the cam 102 that is attached to the output shaft 118 rotates with the output shaft 118.

The cam rotation increases the gap between the cam 102 and nozzle 120 on one side of the cam 102 and decreases the gap between the cam 102 and nozzle 120 on the other side. The differences in the gaps affect the Pz1 and Pz2 pressures on the ends 124 of the control piston 122 so as to force the control piston 122 in the direction that will re-equalize the cam-nozzle gaps. The control piston translation opens the head port 126 and rod port 128 to supply or drain, thereby causing the actuator piston 130 and rack 108 to stroke. The rack 108 provides direct actuator position feedback to the ring gear 106, causing the ring gear 106 to rotate. The ring gear rotation causes the sun gears 114 and sun frame 116 to rotate back to their original position, thereby rotating the cam and translating the control piston 122 to the mechanical null position (i.e., the center position).

When the cam 102 is in the center position, the hydraulic flow will enter port 134, pass through the cam-nozzle-orifice system (i.e., around cam 102 and through nozzles 120 and corresponding orifices), enter line 136, and then drain out through Pb port 138 due to the lower pressure in the Pb drain. It should be noted that the direction of flow is from line 134 and into the nozzles 120 via the cam-nozzle gap (i.e., "flow in") as compared to conventional valves where flow is from the piston ends 124 out of the nozzle 120 (i.e., "flow out").

Figure 4:
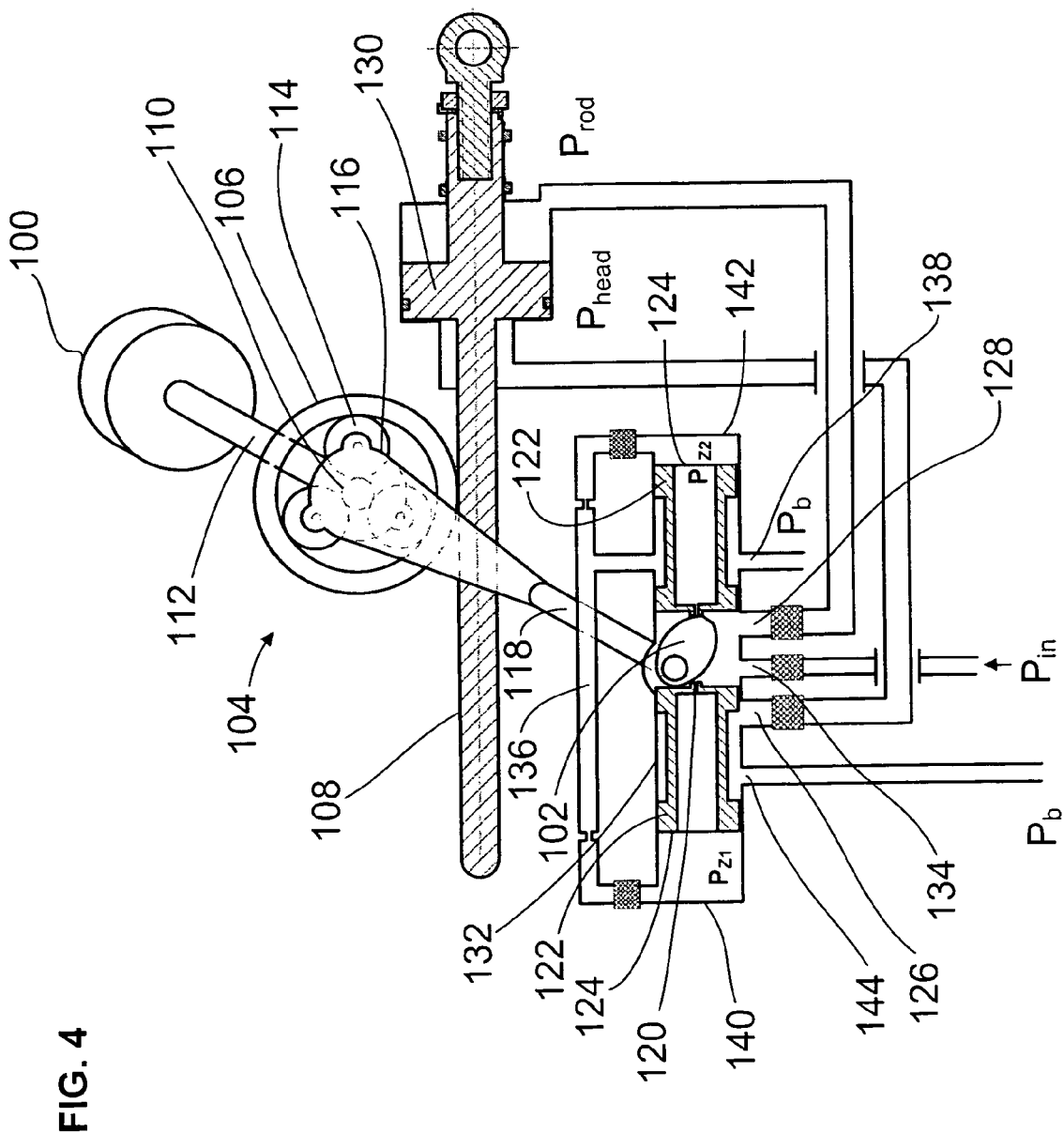
FIG. 4 is a partial cross-sectional view of the actuator system of FIG. 2 with the piston at a position such that flow drives the actuator in the retract direction with the against the retract stop.
Figure 5:
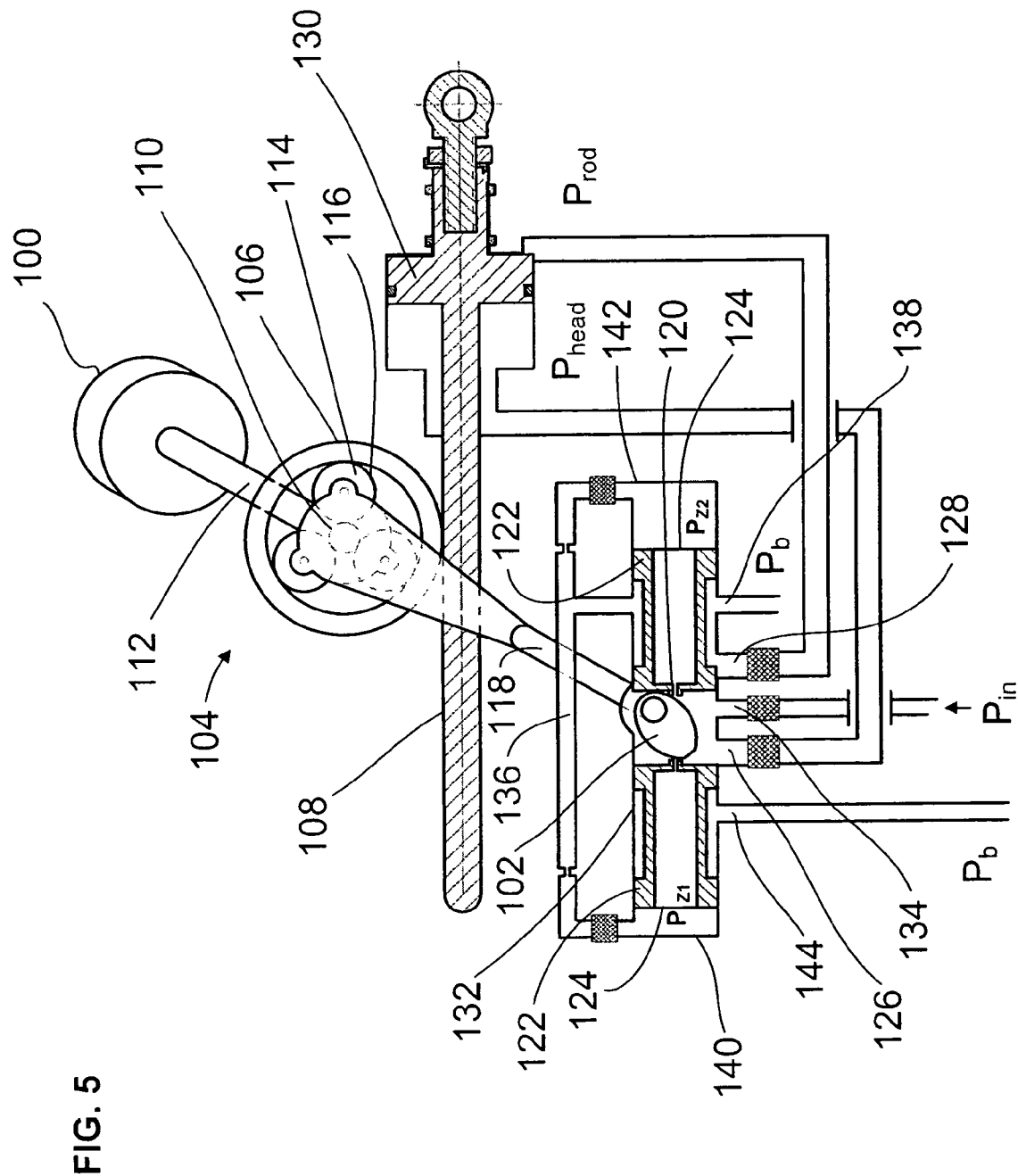
FIG. 5 is a partial cross-sectional view of the actuator system of FIG. 2 with the piston at a position such that flow drives the actuator in the extend direction with the against the extend stop.

Note that when the cam 102 is positioned such that the control piston 122 is towards the left-most position 140 in the control valve body 132, the supply port 134 is opened to the head port 126 (see FIG. 5). When this occurs, the hydraulic flow passes through port 134, out head port 126 and returns through rod port 128 and discharges out Pb port 138. When the cam 102 is positioned such that the control piston 122 is towards the right-most position 142 in the control valve body 132, the supply port 134 is opened to the rod port 128 (see FIG. 4). The hydraulic flow passes through port 134, out rod port 128 and returns through head port 126 and discharges out Pb port 144.

During normal operation with a properly sized hydraulic and electromechanical system, it is unlikely that the control piston 122 will be at either its left-most position 140 or its right-most position 142 (as respectively shown in FIGS. 5 and 4) due to the response of the system. In FIG. 4, the hydraulics are driving the actuator in the retract direction but it is against the retract stop. FIG. 5 depicts the hydraulics driving the actuator in the extend direction but the actuator is against the extend stop. Generally, as the stepper motor 100 rotates the cam 102, the control piston 122 begins to move and flow enters one of the head port 126 or rod port 128. As the control piston 122 continues to move as the cam 102 is rotated, the port through which flow enters (i.e., head port 126 or rod port 128) opens wider, thus increasing flow. As the flow pushes actuator piston 130, rod 108 moves, thus rotating ring gear 106 as described above. The rotation of ring gear 106 by rod 108 results in the cam 102 and control piston 122 translating to the mechanical null position, thus preventing further flow to the actuator. The result is a proportional tracking of the actuator 130 to the motor rotor 112. As long as the dynamics of the system are sufficient fast so as to keep up with the input from the motor 100, the actuator 130 will track the motor 100 commands with relatively small transient rotations of shaft 118, cam 102 and translations of control piston 122.

The primary disturbance to the system is the force input to the actuator. Any movement of the actuator piston 130 will cause rack 108 translation and ring gear 106 rotation. Any ring gear movement results in cam 102 rotation due to the precision gearbox system 104. The high pressure gain of the system assures control piston 122 movement for any cam 102 rotation. The high pressure gain of the control valve ports 126 & 128 coupled with the large head/rod areas will result in the required resistive force with minimal position error.

An example of the stiffness of the system is provided below. Assume for purposes of discussion that there are 103 gear teeth on the inner diameter of the ring gear 106 (approximately 130 teeth on the outer diameter), 45 gear teeth oil each sun gear 114, 13 gear teeth on the pinion gear 110, 33 teeth per inch on rack 108 and the motor pinion rotating approximately 1.73 degrees per step of the stepper motor 100. With the proper cam sizing as described in U.S. application Ser. No. 11/094,099, filed Apr. 27, 2005, hereby incorporated by reference in its entirety, there is 418 steps per inch of actuator stroke. A 0.001 inch actuator stroke error is equivalent to 0.091 degrees of ring rotation. 0.091 degrees of ring rotation leads to 0.081 degrees of cam rotation (neglecting gearbox slop). The cam rise of 0.004 in/degree yields 0.000324 inches of control valve stroke. Assuming a control port pressure gain of approximately 125000 psid/in, the actuator stroke error equates to a dP of 40 psid. Assuming an actuator with a 5 $in^2$ head area and a 4.25 $in^2$ rod area, Pb=100 and Ps=600 psid, the resulting change in force is approximately 185 lbs. The resulting disturbance rejection is approximately 185,000 lbs/in (neglecting any rack and gearbox backlash). A 500 lb external force would move the actuator 0.0027 inches or 0.09% stk. As can be seen from the foregoing, the actuator system of the invention is very stiff.

The stepper motor system is a relatively low energy motor coupled to relatively high energy hydraulics. The stepper motor in combination with a gearbox provides the capability to decrease stepper motor speed and increase its torque while staying at the same energy level. This is accomplished by proper selection of the motor stator and rotor tooth count and the gearbox ratio. This can be used to increase the motor torque, decrease it's susceptibility to torque disturbances and still keep the motor fast enough to handle dynamic operation. The stepper motor has nearly perfect gain and is essentially unaffected by torque disturbances due to higher torque capability, the gear box torque amplification and the inherent detent feature of the stepper motor. The round, symmetrical, balanced construction of the stepper motor is in essence unaffected by vibration and temperature variations.

The precision machined placement of stator and rotor teeth provide the inherent baseline position and gain accuracy of the stepper motor. If an accurate calibration is made, and the effects of disturbances are negated, the need for a sensor is eliminated. This accuracy does not change with life, is essentially constant from unit to unit, and is not a function of any calibration procedure. The round, symmetric construction of the stepper motor maintains this accuracy in the presence of environment variations (e.g., temperature). Torque disturbances at the output shaft such as dynamic seal friction, nozzle hydraulic loads, unbalanced cam mass, etc. are minimal and are essentially rejected by the precision gearbox 140 (comprising pinion gear 110, ring gear 106, sun gears 114 and sun frame 116) and the high detent torque of the motor. The detent torque prevents disturbances from having any appreciable effect until they reach such a magnitude that they completely overpower the stepper motor. The stepper motor rotor rides on precision ball bearings and is inherently precision-balanced about its rotation axis in the presence of translational accelerations (i.e., vibration), so the torque disturbances at the motor rotor are negligible. The stepper motor 100 has no channel-channel tracking error due to the fact that both channels share the same rotor-stator-pole flux circuit. Power transients have no effect on steady state operation and the precision gearbox has minimal backlash. In one embodiment, the backlash of the gearbox 140 is approximately two step increments of the stepper motor 100.

As can be seen from the foregoing, a robust stepper motor driven proportional actuator has been described. Robustness, as used herein, refers to the ability of a system to remain accurate in the presence of disturbance inputs and environment variations. Disturbances lead to a shift in the entire step versus position plot and gain variations lead to changes in the slope of the plot. Disturbances are due to undesired torques and forces as well as imperfect calibration. Gain variations are due to the change in output/input characteristics due to component life and environment. Robustness is obtained by the invention by minimizing the magnitude of disturbances where possible, by isolating the device from disturbances where necessary, maximizing the disturbance rejection characteristics of the device, designing a device with minimal wear and/or whose performance is unaffected by wear, precision calibration, and inherent gain accuracy in the presence of environment variations (e.g., temperature, stray flux, vibration, pressures, etc.).

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. For example, a ball screw can be used where the ball portion is mounted in the actuator with the screw integral to the ring gear. Actuator translation would cause the ring gear to rotate as described above. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A stepper motor driven actuator comprising:
   a stepper motor;
   a cam operatively connected to the stepper motor, the cam rotating position in response to stepping of the stepper motor, the cam positioned within a valve body having an inlet port, a rod port, a head port and at least one drain port;
   a control piston positioned within the valve body and having a plurality of nozzles positioned on opposite sides of the cam in close proximity to a surface of the cam and movable between a null position and flow positions, each of the plurality of nozzles having a flow path, the control piston moving as a result of a pressure imbalance at the ends of the control piston occurring in response to a change in position of the cam such that a difference between a first gap between the surface of the cam and one of the plurality of nozzles and a second gap between the surface of the cam and an other of the plurality of nozzles is minimized; and
   an actuator having a piston integral to a rack that is operably coupled to the cam, the piston having a first side and a second side, the first side being in fluid communication with the head port and the second side being in fluid communication with the rod port, the cam moving in response to the rack moving.

2. The actuator of claim 1 wherein the cam is connected to an output shaft, the actuator further comprising a gearbox connected between a rotor of the stepper motor and the output shaft.

3. The actuator of claim 2 wherein the gearbox comprises:
   a sun frame attached to the output shaft and a plurality of sun gears;
   a ring gear operatively connected to the plurality of sun gears and the rack; and
   a pinion gear connected to the rotor and operatively connected to the plurality of sun gears.

4. The actuator of claim 3 wherein the rack provides direct actuator feedback to the ring gear.

5. The actuator of claim 3 wherein translation of the control piston opens one of the head port and rod port to supply and the other of the head port and rod to drain, thereby causing the actuator piston and rack to stroke.

6. The actuator of claim 3 wherein translation of the control piston towards a first end of the valve body opens the head port to supply and the rod port to drain.

7. The actuator of claim 6 wherein translation of the control piston towards a second end of the valve body opens the head port to drain and the rod port to supply.

8. The actuator of claim 3 wherein the ring gear rotates in response to the rack stroking, the ring gear rotation causing the plurality of sun gears and the sun frame to rotate back to their position prior to the translation of the control piston, thereby rotating the cam and translating the control piston to a mechanical null position.

9. The actuator of claim 1 wherein the stepper motor is wound such that the actuator may be operated in a dual channel mode of operation.

10. The actuator of claim 1 wherein the control piston, the valve body and the cam provide four way operation.

11. A stepper motor driven actuator system comprising:
a stepper motor;
a gearbox operatively connected to the stepper motor;
a cam operatively connected to the gearbox, the cam rotating position in response to stepping of the stepper motor, the cam positioned within a valve body having an inlet port, a rod port, a head port and at least one drain port;
a control piston positioned within the valve body and having a pair of nozzles positioned on opposite sides of the cam in close proximity to a surface of the cam so as to each define a gap therebetween, each of the pair of nozzles having a flow path, the control piston moving as a result of a pressure imbalance at the ends of the control piston occurring in response to a change in the gap between the surface of the cam and each of the nozzles due to a change in position of the cam; and
an actuator having a piston integral to a rack, the piston having a first side and a second side, the first side in fluid communication with the head port and the second side in fluid communication with the rod port, the rack in mesh relationship to the gearbox, the cam moving in response to the rack moving.

12. The actuator system of claim 11 further comprising an output shaft operatively connected to the cam and the gearbox.

13. The actuator system of claim 12 wherein the gearbox comprises:
a sun frame attached to the output shaft and a plurality of sun gears;
a ring gear operatively connected to the plurality of sun gears and the rack; and
a pinion gear connected to a rotor of the stepper motor and operatively connected to the plurality of sun gears.

14. The actuator system of claim 13 wherein the rack provides direct actuator feedback to the ring gear.

15. The actuator system of claim 13 wherein the ring gear rotates in response to the rack stroking, the ring gear rotation causing the plurality of sun gears and the sun frame to rotate back to their position prior to the translation of the control piston, thereby rotating the cam and translating the control piston to a mechanical null position.

16. The actuator system of claim 13 wherein rotation of the pinion gear is countered by translation of the rack.

17. The actuator system of claim 11 wherein translation of the control piston towards a first end of the valve body opens the head port to supply and the rod port to drain.

18. The actuator system of claim 17 wherein translation of the control piston towards a second end of the valve body opens the head port to drain and the rod port to supply.

19. The actuator system of claim 11 wherein each of the plurality of nozzles has a first end by the cam and a second end opposite the cam, and wherein flow enters the plurality of nozzles in the first end and out the second end.

20. The actuator system of claim 11 where the actuator system has a disturbance rejection of at least 180,000 pounds per inch.

* * * * *